(12) United States Patent
Sielaff

(10) Patent No.: US 8,068,711 B2
(45) Date of Patent: Nov. 29, 2011

(54) ADAPTER FOR SLEEVES WITH ELASTOMER CABLE SEALS AND METHOD FOR INTRODUCING A FIBER-OPTIC CABLE INTO A SLEEVE

(75) Inventor: Michael Sielaff, Berlin (DE)

(73) Assignee: ADC GmbH, Berlin (DE)

( * ) Notice: Subject to any disclaimer, the term of this patent is extended or adjusted under 35 U.S.C. 154(b) by 102 days.

(21) Appl. No.: 12/497,904

(22) Filed: Jul. 6, 2009

(65) Prior Publication Data
US 2010/0046904 A1 Feb. 25, 2010

(30) Foreign Application Priority Data

Jul. 11, 2008 (DE) .......................... 10 2008 032 753

(51) Int. Cl.
*G02B 6/00* (2006.01)
(52) U.S. Cl. ........................................ 385/134; 385/147
(58) Field of Classification Search .......... 385/133–139, 385/88, 100
See application file for complete search history.

(56) References Cited

U.S. PATENT DOCUMENTS

| 3,636,241 | A | | 1/1972 | Baumgartner et al. | |
| 5,113,475 | A | * | 5/1992 | Baker | 385/138 |
| 5,283,853 | A | * | 2/1994 | Szegda | 385/139 |
| 5,517,592 | A | * | 5/1996 | Grajewski et al. | 385/138 |
| 5,605,413 | A | * | 2/1997 | Brown | 404/6 |
| 5,644,673 | A | * | 7/1997 | Patterson | 385/138 |
| 6,052,504 | A | | 4/2000 | Frohlich et al. | |
| 2009/0103876 | A1 | * | 4/2009 | Kluwe et al. | 385/134 |

FOREIGN PATENT DOCUMENTS

| DE | 2 157 718 | 7/1972 |
| DE | 43 33 067 | 3/1995 |
| EP | 0 645 656 | 3/1995 |
| WO | WO 96/32660 | 10/1996 |

* cited by examiner

*Primary Examiner* — Akm Ullah
(74) *Attorney, Agent, or Firm* — Merchant & Gould P.C.

(57) ABSTRACT

The invention relates to an adapter (1) for sleeves (20) with elastomer cable seals (28), comprising at least one tubular element (3) and a support element (2), the support element (2) comprising means for fastening the support element (2) to a lower housing part (21) of a sleeve (20) and to a method for introducing a fiber-optic cable into a sleeve (20) using an adapter (1).

20 Claims, 4 Drawing Sheets

ADAPTER FOR SLEEVES WITH ELASTOMER CABLE SEALS AND METHOD FOR INTRODUCING A FIBER-OPTIC CABLE INTO A SLEEVE

This application is claims benefit of Serial No. 10 2008 032 753.0, filed 11 Jul. 2008 in Germany and which application is incorporated herein by reference. To the extent appropriate, a claim of priority is made to the above disclosed applications.

BACKGROUND

The invention relates to an adapter for sleeves with elastomer cable seals and to a method for introducing a fiber-optic cable into such a sleeve.

Sleeves for optical-fiber cables have two sealing systems that differ in principle, namely elastomer cable seals in the lower housing part of the sleeve and shrink collars.

Recently, new types of optical-fiber cables known as blown-fiber cables have been developed. They comprise a multiplicity of ducts, through which fibers are subsequently blown by means of compressed air. These cables are extremely rigid, so that their direct introduction into the sleeve causes difficulties when the sleeve is subsequently moved.

To solve the problem, it is conceivable to strip some of the sheathing from the cable and introduce the ducts directly into the sleeve. The ducts could then be protected outside the sleeve by a flexible tube, which is then brought up to the sleeve. However, this causes problems at the elastomer cable seal.

SUMMARY

The invention is based on the technical problem of providing an adapter for sleeves with elastomer cable seals and a method for introducing a fiber-optic cable, in particular a blown-fiber cable, into a sleeve, by means of which the aforementioned problems are solved.

For this purpose, the adapter for sleeves with elastomer cable seals comprises a tubular element and a support element, the support element comprising means for fastening the support element to a lower housing part of a sleeve. This makes it possible for the sleeve to be subsequently converted in such a way that it allows the use of shrink collars. In this case, the tubular element is sealed by means of the elastomer cable seal, whereas a flexible tube, for example, or a wall bushing is connected in a sealing manner to the tubular element by means of a shrink collar.

In principle, the adapter may be formed in one piece or as one part. Preferably, however, the support element and the tubular element are separate components, so that the tubular element can be easily introduced into the sleeve and sealed. The main function of the support element is in this case the mechanical support of the tubular element.

In a further preferred embodiment, the tubular element is formed as a metal tube, whereas the support element preferably consists of plastic. Further embodiments in which the tubular element consists of plastic are possible, the plastic not necessarily having to be the plastic of the support element.

The support element preferably comprises an annular holding element, which engages around the tubular element.

With respect to the method, firstly the tubular element is sealed by means of the elastomer cable seal and the support element is fastened to the lower housing part of the sleeve, the tubular element protruding into the sleeve. The fiber-optic cable to be introduced, in particular a blown-fiber cable, is then partially stripped of its sheathing and the stripped part is threaded through a flexible tube. Subsequently, a shrink collar is pulled over and shrunk on over the cable sheath and the flexible tube. Subsequently, the stripped part of the cable is then led through the tubular element until the flexible tube finishes flush with the tubular element or else is pushed partially onto the tubular element. Finally, a shrink collar is then shrunk on over the tubular element and the flexible tube.

BRIEF DESCRIPTION OF THE DRAWINGS

The invention is explained in more detail below on the basis of a preferred exemplary embodiment. In the figures.

DETAILED DESCRIPTION

Figure 1:
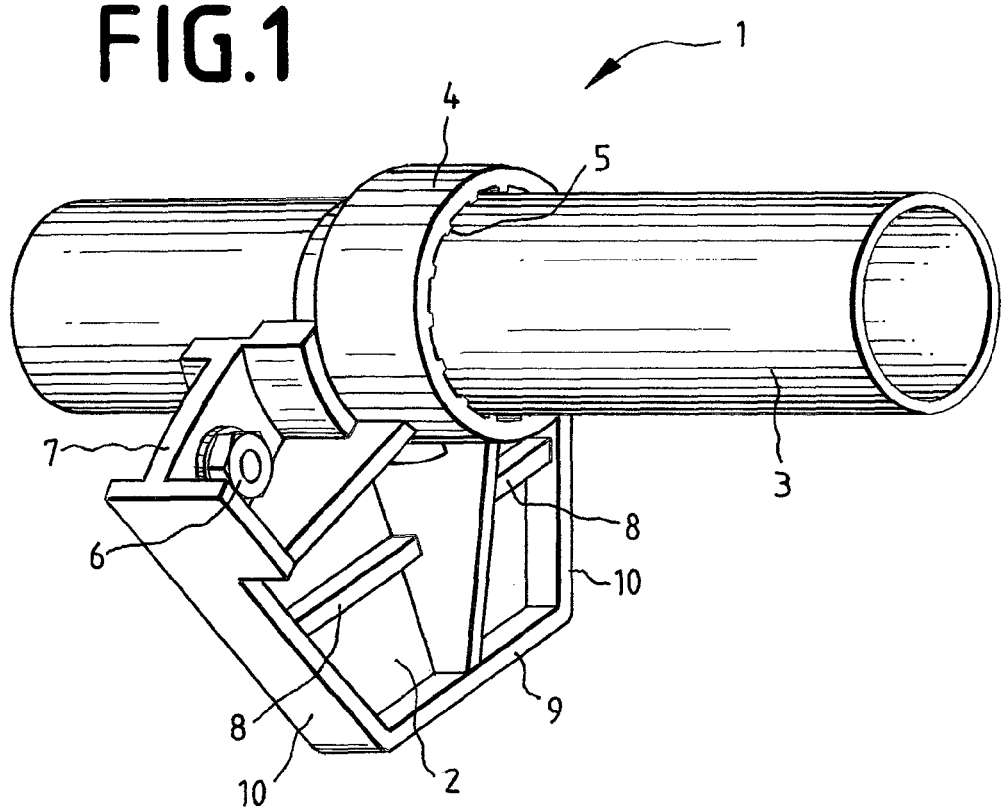
FIG. 1 shows a perspective side view of an adapter for sleeves with elastomer cable seals.
Figure 2:
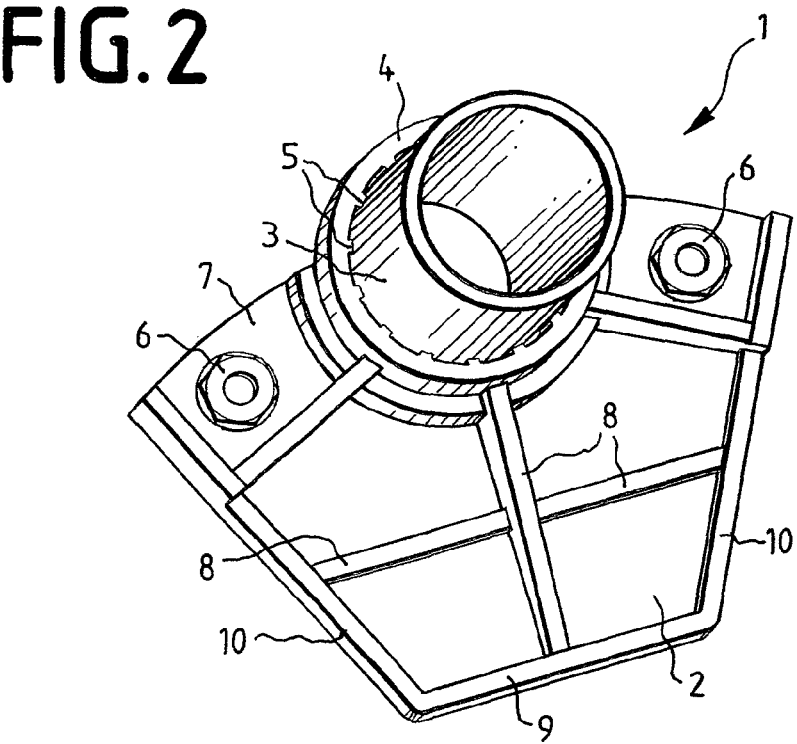
FIG. 2 shows a perspective front view of the adapter according to FIG. 1.

The adapter 1 comprises a support element 2 and a tubular element 3. The support element 2 comprises an annular holding element 4, through which the tubular element 3 is inserted. The annular holding element 4 is profiled on its inner surface and has teeth 5, in order to prevent the tubular element 3 from slipping. Furthermore, the support element 2 has openings, through which fastening screws 6 are inserted in order to screw the support element 2 to a lower housing part of a sleeve. An upper edge 7 of the support element 2 is of a rounded form, in order to match the circular form of the lower housing part. Furthermore, the support element 2 has various reinforcing ribs 8. The lower edge 9 is shorter than the upper edge 7, so that the side edges 10 run obliquely away from the upper edge 7 to the lower edge 9. As a result, the support element 2 is of an almost trapezoidal form. The tubular element 3 is in this case formed as a metal tube, whereas the support element 2 consists of plastic. The tubular element 3 may also be made of plastic.

Figure 3:
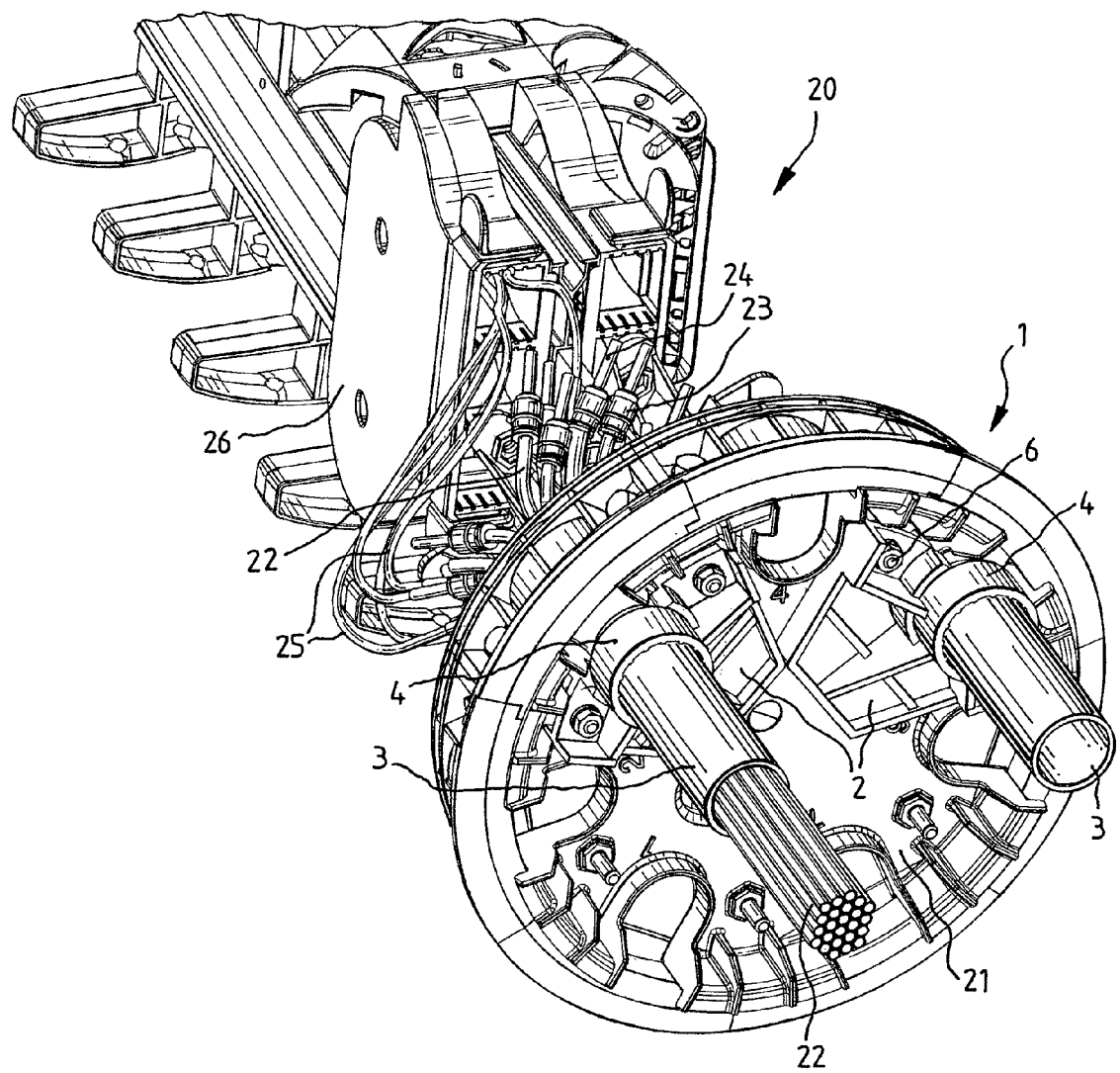
FIG. 3 shows a perspective front view of a lower housing part of a sleeve with fastened adapters.

In FIG. 3, part of a sleeve 20 with elastomer cable seals is represented, two adapters 1 having been screwed on a lower housing part 21 of the sleeve 20. The tubular elements 3 in this case protrude into the sleeve 20 and are sealed by the elastomer cable seals, so that no moisture can get into the sleeve. Ducts 22 of a blown-fiber cable (not represented any further) protrude from the left-hand tubular element 3. Optical fibers can then be routed in these ducts 22. Inside the sleeve 20, the ducts 22 are cut to length and terminated with watertight connectors 23. Then short tubes 24, known as furcation tubes, are fitted onto these connectors. Further tubes 25 of a smaller diameter are then inserted into the tubes 24 and these tubes of a smaller diameter are led to a fiber management unit 26.

Figure 4:
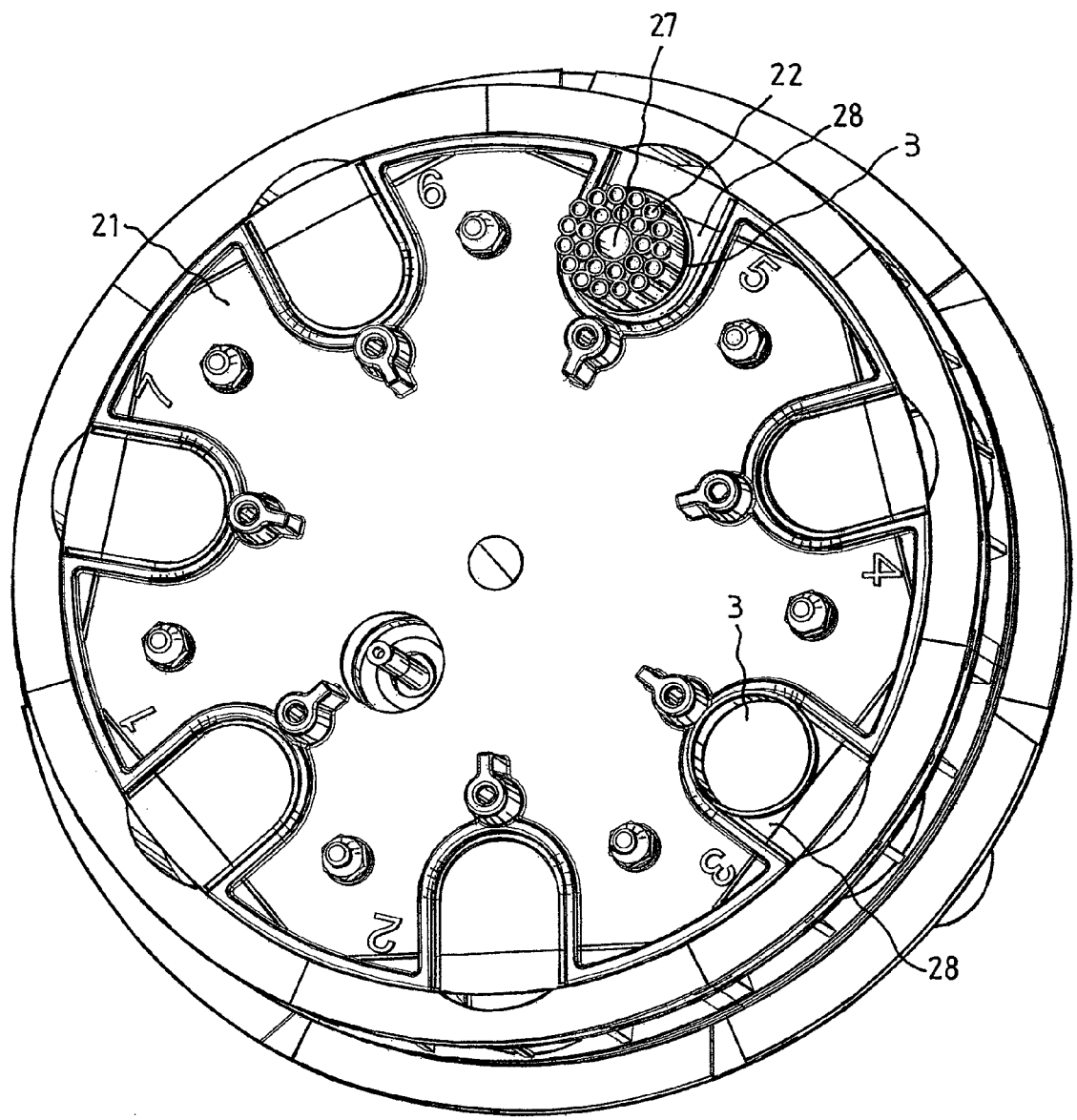
FIG. 4 shows a perspective rear view of the lower housing part with adapters and FIG. 5 shows a perspective front view of the lower housing part with adapters and optical-fiber cables.

In FIG. 4, a rear view of the lower housing part 21 is represented, revealing the two tubular elements 3 of FIG. 3. Also shown are the ducts 22, in the middle of which an inner tube 27 is arranged. This inner tube 27 may also be used in principle for the routing of optical fibers. On the other hand, it is also possible to cut off the inner tube 27 with the stripped part of the cable, so that the flexibility is increased. The elastomer cable seal 28 is then arranged around the tubular elements 3.

Figure 5:
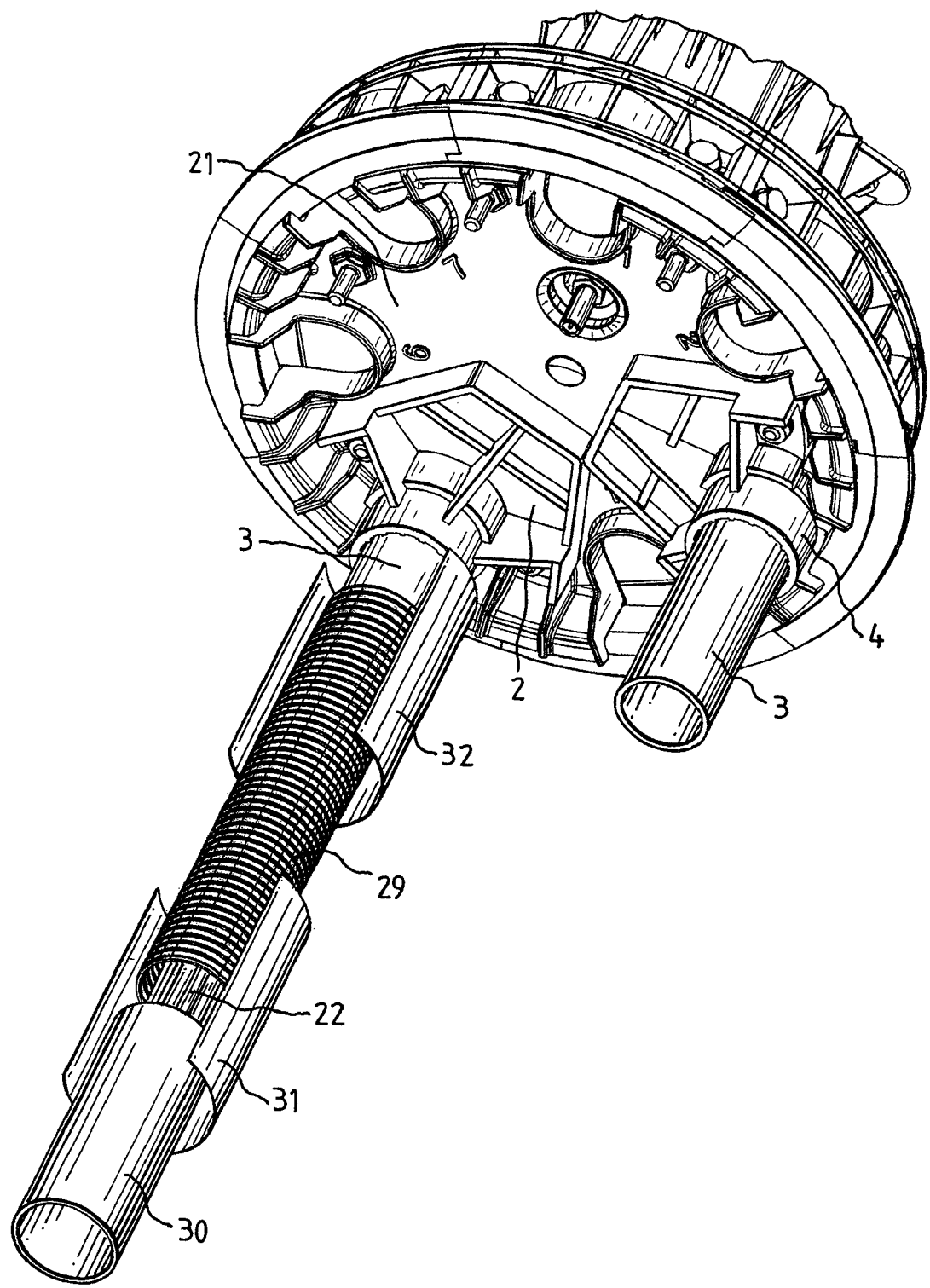

The way in which the method provides for the optical-fiber cable, in particular the blown-fiber cable, to be connected is to be explained in more detail on the basis of FIG. 5. Firstly, the optical-fiber cable is partially stripped of its sheathing, so that the ducts 22 and the inner tube 27 are exposed. A wall bushing or a flexible tube 29 is pulled over the stripped part and pulled down as far as the remaining cable sheath 30. Then a first shrink collar 31 is placed over the cable sheath 30 and the flexible tube 29 and shrunk on, so that the transition between the cable sheath 30 and the flexible tube 29 is watertight. By contrast with the representation, the shrink collar in this case actually encompasses the complete circumference. The ducts 22 are subsequently led through the tubular element, until the flexible tube 29 comes up against the tubular element 3, the flexible tube 29 partially being pulled over the tubular element 3 if this is appropriate. Then the flexible tube 29 and the tubular element 3 are connected to each other in a watertight manner by means of a second shrink collar 32.

It should be noted here that, in the examples represented, a support element 2 in each case only comprises one holding element 4. However, embodiments in which a support element 2 comprises two or more holding elements 4 are also possible.

LIST OF DESIGNATIONS 1 adapter
2 support element
3 tubular element
4 holding element
5 teeth
6 fastening screws
7 upper edge
8 reinforcing ribs
9 lower edge
10 side edges
20 sleeve
21 lower housing part
22 ducts
23 connectors
24 tubes
25 tubes
26 fiber management unit
27 inner tube
28 elastomer cable seal
29 flexible tube
30 cable sheath
31 shrink collars
32 shrink collars

The invention claimed is:

1. An adapter for a sleeve having a lower housing part and elastomer cable seals, the adapter comprising:
   a support element having a rounded upper edge, the support element also having a lower edge that is shorter than the upper edge, the support element comprising means for fastening the support element to the lower housing part of the sleeve; and
   a tubular element coupled to the support element at the rounded upper edge, the tubular element extending outwardly from opposite sides of the support element, the tubular element defining a through-passage.

2. The adapter as claimed in claim 1, wherein the tubular element and the support element are separately formed components.

3. The adapter as claimed in claim 2, wherein the tubular element is formed as a metal tube.

4. The adapter as claimed in claim 1, wherein the support element is formed as a plastic part.

5. The adapter as claimed in claim 1, wherein the support element comprises an annular holding element, through which the tubular element is led to couple the tubular element to the support element.

6. A method for introducing a fiber-optic cable into a sleeve with elastomer cable seals by means of an adapter, the method comprising:
   a) sealing a tubular element of the adapter with an elastomer cable seal at an opening of the sleeve and fastening the adapter to the sleeve,
   b) stripping sheathing from a fiber-optic cable to be introduced to form a stripped part of the fiber-optic cable,
   c) threading the stripped part of the fiber-optic cable through a flexible tube,
   d) pulling a first shrink collar over the sheathing and the flexible tube and shrinking the first shrink collar over the sheathing and the flexible tube at one end of the stripped part of the fiber-optic cable,
   e) leading the stripped part of the fiber-optic cable through the tubular element until the flexible tube lies flush against the tubular element or has been pushed partially onto the tubular element, and
   f) shrinking a second shrink collar over the tubular element and the flexible tube.

7. The method as claimed in claim 6, further comprising cutting an inner tube of the fiber-optic cable at the stripped part of the fiber-optic cable to increase flexibility of the stripped part of the fiber-optic cable.

8. A fiber optic system comprising:
   a sleeve defining a plurality of openings, each of the openings including an elastomeric cable seal;
   an adapter coupled to the sleeve at one of the openings, the adapter including a tubular element extending through the opening and sealed by the elastomeric cable seal, the tubular element defining a passage;
   a blown fiber cable including a stripped region that extends through the passage of the tubular element; and
   a flexible tube having a first end and a second end, the first end being secured to the blown fiber cable at an end of the stripped region, the second end being secured to the tubular element of the adapter.

9. The fiber optic system as claimed in claim 8, wherein the first end of the flexible tube is heat-shrunk over the end of the stripped region and the second end of the flexible tube is heat-shrunk over the tubular element of the adapter.

10. The fiber optic system as claimed in claim 8, wherein the adapter includes a support element coupled to the tubular element, the support element being fastened to the sleeve at the one opening.

11. The fiber optic system as claimed in claim 10, wherein the tubular element is metal and the support element is plastic.

12. The fiber optic system as claimed in claim 10, wherein the support element includes an annular holding element through which the tubular element extends.

13. The fiber optic system as claimed in claim 12, wherein the annular holding element includes a plurality of inwardly extending teeth to inhibit slippage of the tubular element within the annular holding element.

14. The fiber optic system as claimed in claim 10, wherein the support element includes reinforcing ribs.

15. An adapter for a sleeve, the adapter comprising:
   a support element including an annular member coupled to a plate, the annular member defining a passage, the plate having side edges that extend obliquely between an upper edge and a lower edge, and the plate defining a fastener opening on different sides of the annular member at the upper edge; and a tubular member that is positioned and held within the passage of the annular member, the tubular member being formed separately from the support element.

16. The adapter of claim 15, wherein the plate includes a plurality of reinforcing ribs.

17. The adapter of claim 15, wherein the support element is formed from a different material than the tubular element.

18. The adapter of claim 15, wherein the annular member includes a plurality of inwardly extending teeth.

19. The adapter of claim 15, wherein the tubular member is formed from metal.

20. The adapter of claim 15, wherein the tubular member is formed from plastic.

* * * * *